US008786855B2

(12) United States Patent
Demmer et al.

(10) Patent No.: US 8,786,855 B2
(45) Date of Patent: *Jul. 22, 2014

(54) SHAPED INPUT APERTURES TO IMPROVE RESOLUTION IN GRATING SPECTROMETERS

(75) Inventors: David R. Demmer, Toronto (CA); Thomas L. Haslett, Toronto (CA); Jason M. Eichenholz, Orlando, FL (US)

(73) Assignee: Ocean Optics, Inc., Dunedin, FL (US)

( * ) Notice: Subject to any disclaimer, the term of this patent is extended or adjusted under 35 U.S.C. 154(b) by 352 days.

This patent is subject to a terminal disclaimer.

(21) Appl. No.: 13/357,804

(22) Filed: Jan. 25, 2012

(65) Prior Publication Data

US 2012/0188542 A1    Jul. 26, 2012

Related U.S. Application Data

(60) Provisional application No. 61/435,897, filed on Jan. 25, 2011.

(51) Int. Cl.
*G01J 3/28* (2006.01)
*G02B 26/02* (2006.01)
*G01J 3/02* (2006.01)
*G01J 3/04* (2006.01)

(52) U.S. Cl.
CPC ............... *G01J 3/04* (2013.01); *G01J 3/0291* (2013.01); *G01J 3/0208* (2013.01); *G01J 3/0286* (2013.01); *G01J 3/0256* (2013.01); *G01J 3/0229* (2013.01); *G01J 3/0205* (2013.01)
USPC ........................... 356/328; 356/326; 359/232

(58) Field of Classification Search
CPC ...... G01J 3/0286; G01J 3/0256; G01J 3/0291; G01J 3/0229; G01J 3/02–3/108
USPC .......... 356/300–334; 359/232, 233, 462–464, 359/618, 619, 621, 622
See application file for complete search history.

(56) References Cited

U.S. PATENT DOCUMENTS

| | | | | |
|---|---|---|---|---|
| 4,264,205 A * | 4/1981 | Landa | ............................ | 356/326 |
| 4,285,596 A * | 8/1981 | Landa | ............................ | 356/308 |
| 4,753,530 A * | 6/1988 | Knight et al. | ..................... | 356/73 |
| 4,883,963 A * | 11/1989 | Kemeny et al. | ........... | 250/339.11 |
| 5,767,966 A * | 6/1998 | Iwasaki | .......................... | 356/328 |
| 5,781,290 A * | 7/1998 | Bittner et al. | ................... | 356/326 |
| 5,969,812 A * | 10/1999 | Carver | ........................... | 356/319 |
| 6,507,398 B1 * | 1/2003 | Arai et al. | ...................... | 356/328 |
| 6,587,198 B2 * | 7/2003 | Olshausen | ..................... | 356/328 |
| 6,647,090 B2 * | 11/2003 | Kawahara et al. | ............... | 378/45 |
| 7,199,877 B2 * | 4/2007 | Kehoe et al. | ................... | 356/328 |
| 7,209,230 B2 * | 4/2007 | Odhner | ......................... | 356/328 |
| 7,233,394 B2 * | 6/2007 | Odhner | ......................... | 356/328 |
| 7,292,335 B2 * | 11/2007 | Brill et al. | ....................... | 356/319 |
| 7,652,765 B1 * | 1/2010 | Geshwind et al. | ............. | 356/330 |
| 8,068,278 B2 * | 11/2011 | Janson et al. | .................. | 359/472 |
| 8,111,285 B2 * | 2/2012 | Liou et al. | ........................ | 348/54 |

(Continued)

*Primary Examiner* — Kara E Geisel
*Assistant Examiner* — Violeta A Prieto
(74) *Attorney, Agent, or Firm* — Dennis L. Cook, Esq.

(57) ABSTRACT

An aperture shaped to provide a narrow beam in the horizontal plane but a wider beam in the vertical plane that will provide improved image quality in spectrometers without sacrificing as much throughput as typically experienced using a reduced diameter round aperture along with a method of mounting the entrance slit and the limiting aperture on a transparent block for optical stability and ease of alignment is disclosed.

2 Claims, 3 Drawing Sheets

(56) References Cited

U.S. PATENT DOCUMENTS

| | | | |
|---|---|---|---|
| 2002/0126278 A1* | 9/2002 | Olshausen | 356/328 |
| 2002/0172322 A1* | 11/2002 | Kawahara et al. | 378/45 |
| 2003/0202173 A1* | 10/2003 | Nolan | 356/121 |
| 2004/0017979 A1* | 1/2004 | Loni | 385/52 |
| 2005/0270528 A1* | 12/2005 | Geshwind et al. | 356/330 |
| 2006/0082772 A1* | 4/2006 | Kehoe et al. | 356/328 |
| 2006/0098195 A1* | 5/2006 | Brill et al. | 356/326 |
| 2008/0013086 A1* | 1/2008 | Deck | 356/328 |
| 2009/0091754 A1* | 4/2009 | Zhang | 356/326 |
| 2009/0237657 A1* | 9/2009 | Warren | 356/328 |
| 2010/0014082 A1* | 1/2010 | Loecklin | 356/328 |
| 2012/0188541 A1* | 7/2012 | Demmer et al. | 356/326 |

\* cited by examiner

SHAPED INPUT APERTURES TO IMPROVE RESOLUTION IN GRATING SPECTROMETERS

CROSS-REFERENCE TO RELATED APPLICATION

The present application claims the benefit of previously filed Provisional Patent Application, Ser. No. 61/435,897 filed on Jan. 25, 2011.

FIELD OF THE INVENTION

This invention belongs to the field of manufacture of spectrometers. More specifically it is a new shaped aperture to improve resolution in grating spectrometers.

BACKGROUND OF THE INVENTION

Many grating spectrometers use a folded optical configuration similar to that shown in FIG. 1. The figure shows several aspects of the device that are pertinent to the following background of the art discussion.

The source (not shown) is placed behind the entrance slit (1), and has a divergence which would lead to overfilling of the entrance mirror, M1 (3). Any light that misses M1 (3) will not form a dispersed image at the detector plane (6), but will instead scatter inside the spectrometer, leading to an increase in background signal.

To avoid this stray light problem, an aperture (2) is used after the slit (1) to limit the acceptance cone of the spectrometer to only light that will strike the input minor (3). The aperture (2) size is usually expressed as an f-number by comparing the size of the beam at M1 (3) to the focal length of M1 (3).

M1 (3) is used as an off-axis collimating element. This introduces a variety of aberrations into the collimated beam, primarily astigmatism and coma. The result is that the nominally collimated beam actually contains a distribution of angles.

The diffraction angle from the grating (5) depends non-linearly on the angle of incidence, so the angular distribution present in the incident beam is broadened in the diffracted beam. Furthermore, since the diffraction angle is also a function of wavelength, the output distributions differ for the various wavelength components of the beam.

M2 (4) is also used as an off-axis element, and therefore contributes its own aberrations into the image formed at the detector (6). M2 (4) must be larger than M1 (3) in order to avoid vignetting the dispersed light diffracted from the grating (5). Since different portions of M2 (4) are used by different wavelength components, the aberration contributions are different as well.

These issues are all well-known, and are traditionally addressed by designing the optical system to minimize both the fold angles and the size of the input aperture (2). By holding both parameters to the smallest possible values the aberrations are minimized.

BRIEF SUMMARY OF THE INVENTION

This invention is a method for improving image quality in a spectrometer using an aperture shaped to provide a narrow beam in the horizontal plane but a wider beam in the vertical plane without sacrificing as much throughput as typically experienced using a reduced diameter round aperture.

BRIEF DESCRIPTION OF THE DRAWINGS

For a fuller understanding of the nature and objects of the invention, reference should be made to the following detailed description, taken in connection with the accompanying drawings, in which.

DESCRIPTION OF THE PREFERRED EMBODIMENT

A key parameter for any photometer is the input NA or f-number. Larger apertures admit more light and therefore provide better sensitivity: all else being equal throughput is expected to be proportional to the square of the aperture size. However, for any optical system aberrations also increase with aperture size. In the case of a spectrometer increased total throughput is of little use if the slit image is blurred in such a way that the peak intensity of a spectral line does not improve because the light is smeared over a larger area. The balance between these competing factors determines the optimum design.

For an optical train which is folded but constrained to a plane the system is less prone to aberrations perpendicular to that plane. That is because the mirrors are effectively being used on-axis in the perpendicular plane, rather than at the fold angle as in the dispersion plane.

Figure 1:
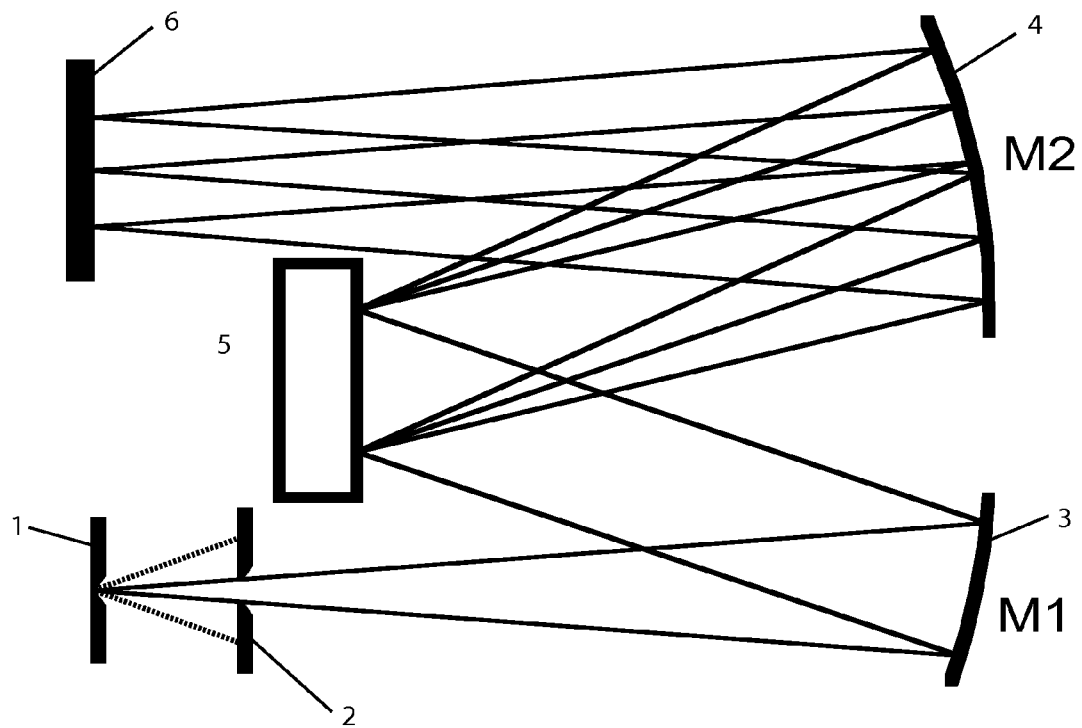
FIG. 1 shows a layout of a generalized prior art Czerny-Turner spectrometer.

This suggests that the system can sustain a larger aperture in the perpendicular than in the dispersion plane. For a spectrometer such as that shown in FIG. 1 an aperture (2) shaped to provide a narrow beam in the horizontal plane but a wider beam in the vertical plane will provide improved image quality without sacrificing as much throughput as a reduced diameter round aperture (2).

While the aperture (2) shape can be anything that provides an adjustable aspect ratio, a convenient choice is an elliptical aperture (2) with a fixed height which fills the input minor (3) and a variable width which is chosen to optimize performance.

For a spectrometer with a fixed slit (1) width it is convenient to use photo-lithographic techniques to pattern the slit (1) and aperture (2) on opposite sides of a transparent input block (8). This avoids the necessity of aligning the aperture (2) to the slit (1) during manufacture, and at the same time provides the aperture (2) with a convenient mount. Having the slit patterned on a glass block also allows the entire optical path to be environmentally sealed for improved performance and deployment possibilities. The advantages of patterning the slit and aperture on a single transparent input block assembly are not limited to spectrometers using a shaped aperture and are equally effective if using a more traditional circular or other shape of aperture and/or slit.

While these issues are common to any folded path spectrometer the details of the aberrations are peculiar to the specific design under consideration. The aperture (2) f-number, minor (3 & 4) focal lengths, fold angles, grating (5) pitch, and angle of incidence at the grating (5) will all contribute to the final image quality. For this reason the optimum aperture (2) aspect ratio is also peculiar to the specific design. It should also be noted that the same basic design can be configured differently for different applications and this, too, can affect the optimum choice of aspect ratio.

Figure 2A:
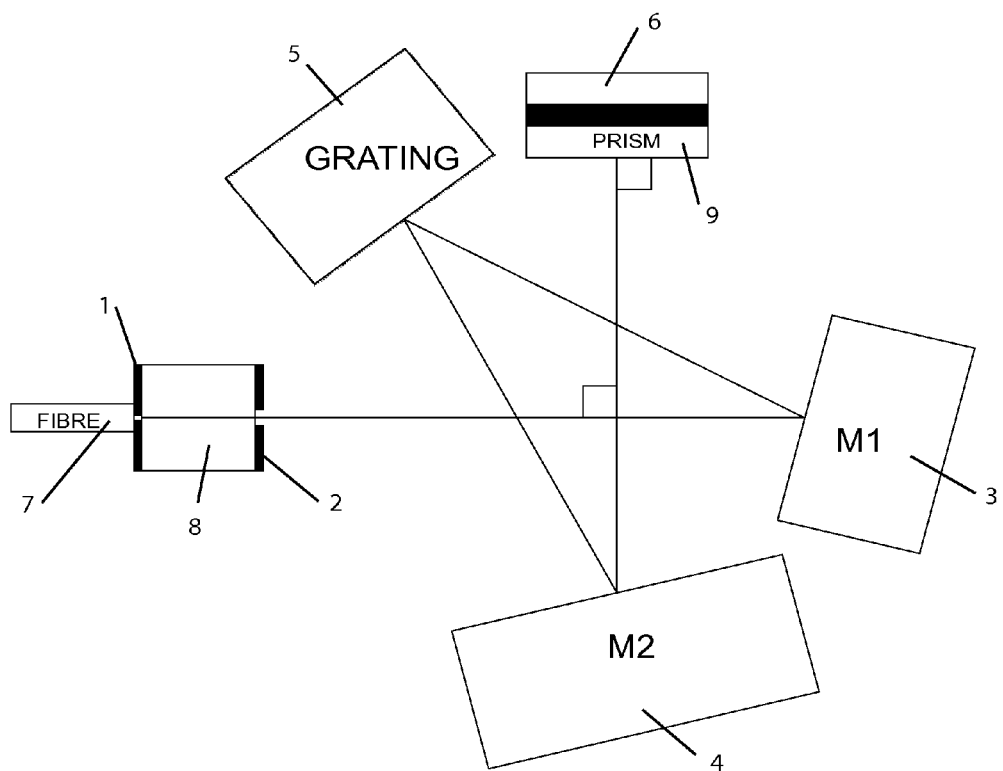
FIGS. 2a., 2b., and 2c. show a preferred embodiment of the invention.
Figure 2B:
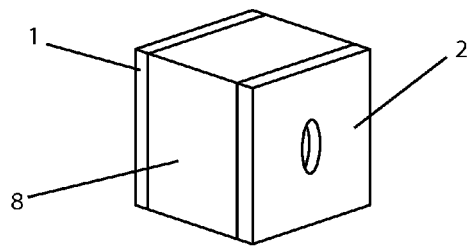
Figure 2C:
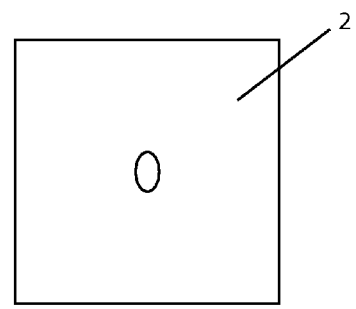

A schematic layout of the preferred embodiment for discussion is shown in FIGS. 2a., 2b.c and 2c. Note the crossed Czerny-Turner design. A typical input fiber (7) has an NA of 0.22, which would result in a beam too large for M1 (3). A limiting aperture (2) is therefore used to maintain an f/4 input beam. The minor (3 & 4) locations and fold angles are configured to maintain perpendicular input and output beams. The grating (5) angle is set to place a 575 nm beam at the center of the output range for a 600 LPM grating. The output beam is folded down through the plane of the figure using a right angle prism (9).

The preferred embodiment detector (6) is a linear array of 1024 pixels with a 7.8 µm pitch. The signal from the preferred embodiment comprises the digitized intensity profile of the dispersed slit (1) image as projected onto the detector array. In order to implement the invention the slit (1) and aperture (2) are most conveniently placed on opposite sides of a transparent input block (8) for ease of manufacture and placement within the spectrometer, but the same remarks apply to a situation where the slit and aperture are separately manufactured and mounted.

The effect of the shaped aperture (2) is conveniently demonstrated using software capable of simulating the system response when illuminated by an extended source such as a multimode optical fiber (7). Simulations were carried out for the case of a 12.4 µm input slit (1) to demonstrate the effect of the shaped aperture (2). Results from simulations at three wavelengths are shown in FIG. 3, illustrating the variation in aberrations experienced at different wavelengths.

Figure 3A:
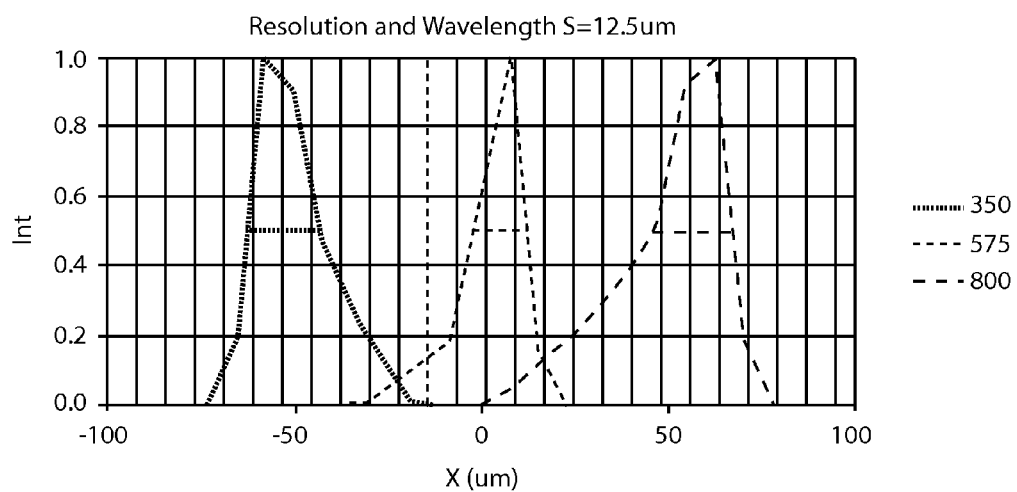
FIGS. 3a. and 3b. show a simulated output of the invention.
Figure 3B:
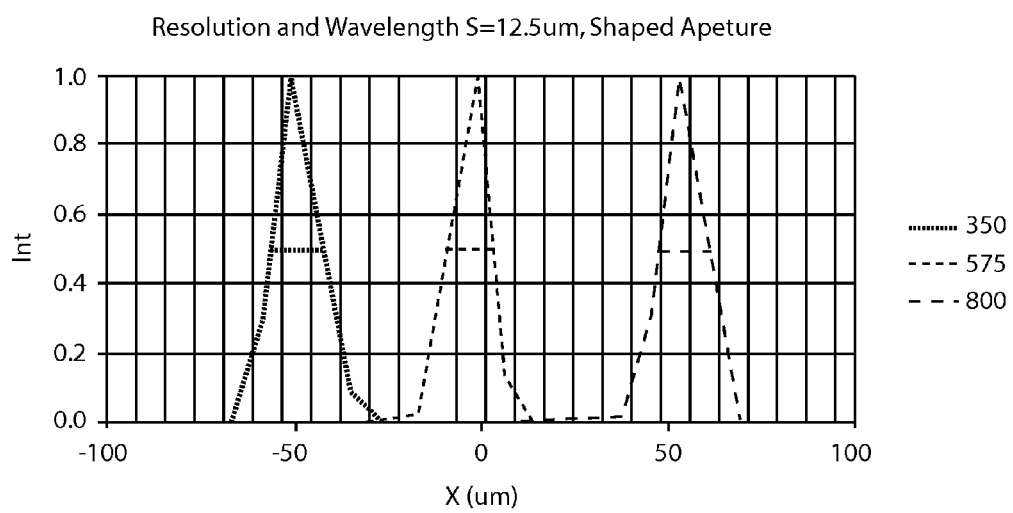

In the simulated preferred embodiment output the peaks are shifted horizontally to allow display on the same plot. In FIG. 3a the system uses a round f/4 input aperture (2). In FIG. 3b an elliptical aperture (2) that is f/4 in the vertical but f/8 in the horizontal direction is used. Computer model results show that while overall throughput decreases by a factor of 2 with the shaped aperture (2), the decrease in peak intensity is much less, between 15-25% depending on wavelength, since it is primarily the light forming the "tails" which is eliminated by the shaped aperture (2).

Since certain changes may be made in the above described shaped input apertures without departing from the scope of the invention herein involved, it is intended that all matter contained in the description thereof or shown in the accompanying figures shall be interpreted as illustrative and not in a limiting sense. In particular, while the illustrative example used involved use of a linear pixel array as the detection element in order to record the entire dispersed spectrum simultaneously, a common variation of the design uses a slit at the image plane to pass only a small portion of the spectrum at a time. In this case the light is then detected by a single element detector and the spectrum is obtained by rotating the grating to pass a different portion of the spectrum through the exit slit in sequence. Such a variant is also known as a monochromator. All of the remarks regarding image quality and resolution apply equally to this special case.

What is claimed is:

1. A device for improving image quality in a grating spectrometer or monochromator having a fixed slit width comprising a light entrance slit and an aperture on opposite sides of a transparent input block.

2. A device for improving image quality in a grating spectrometer or monochromator having a folded optical configuration comprising a light entrance slit and a limiting aperture having a larger aperture number in the dispersion plane than in a plane perpendicular to the dispersion plane further comprising said light entrance slit and said limiting aperture on opposite sides of a transparent input block.

* * * * *